United States Patent [19]
Metlitsky et al.

[11] Patent Number: 5,304,788
[45] Date of Patent: * Apr. 19, 1994

[54] LASER DIODE SCANNER WITH ENHANCED VISIBILITY AT AN AIMING DISTANCE RELATIVE TO THE READING DISTANCE

[75] Inventors: Boris Metlitsky, Hauppauge; Jerome Swartz, Setauket, both of N.Y.

[73] Assignee: Symbol Technologies, Inc., Bohemia, N.Y.

[*] Notice: The portion of the term of this patent subsequent to Aug. 29, 2006 has been disclaimed.

[21] Appl. No.: 865,728

[22] Filed: Apr. 9, 1992

Related U.S. Application Data

[63] Continuation of Ser. No. 706,246, May 28, 1991, abandoned, which is a continuation of Ser. No. 265,149, Oct. 31, 1988, abandoned.

[51] Int. Cl.$^5$ .............................................. G06K 7/10
[52] U.S. Cl. ...................................... 235/467; 235/472
[58] Field of Search .................... 235/462, 467, 472; 250/271; 356/431; 359/196, 220, 221, 213, 214, 215, 668

[56] References Cited

U.S. PATENT DOCUMENTS

| | | | |
|---|---|---|---|
| 4,251,798 | 2/1981 | Swartz et al. | 340/146.3 |
| 4,304,467 | 12/1981 | Rabedeau | 350/449 |
| 4,360,798 | 11/1982 | Swartz et al. | 340/146.3 |
| 4,369,361 | 1/1983 | Swartz et al. | 235/470 |
| 4,387,297 | 6/1983 | Swartz et al. | 235/462 |
| 4,409,470 | 10/1983 | Shepard et al. | 235/472 |
| 4,418,276 | 11/1983 | Yatsunami | 235/462 |
| 4,460,120 | 7/1984 | Shepard et al. | 235/472 |
| 4,496,831 | 1/1985 | Swartz et al. | 234/472 |
| 4,538,895 | 9/1985 | Higgins et al. | 355/3 R |
| 4,593,186 | 6/1986 | Swartz et al. | 235/472 |
| 4,603,262 | 7/1986 | Eastman et al. | 235/472 |
| 4,673,805 | 6/1987 | Shepard et al. | 235/472 |
| 4,694,182 | 9/1987 | Howard | 235/462 |
| 4,736,095 | 4/1988 | Shepard et al. | 235/472 |
| 4,758,717 | 7/1988 | Shepard et al. | 235/467 |
| 4,760,248 | 7/1988 | Swartz et al. | 235/467 |
| 4,805,175 | 2/1989 | Knowles | 235/472 |
| 4,806,742 | 2/1989 | Swartz et al. | 235/472 |
| 4,808,804 | 2/1989 | Krichever et al. | 235/462 |
| 4,820,911 | 4/1989 | Arackellian et al. | 235/467 |
| 4,825,057 | 4/1989 | Swartz et al. | 235/462 |
| 4,933,538 | 6/1990 | Heiman et al. | 235/462 |

OTHER PUBLICATIONS

Dependence of the Focal Shift on Fresnel Number and f Number, J. Opt. Soc. Am./vol. 72, No. 6,/Jun. 1982 Yajun L.

Literature from Microscan Systems, Inc., Tukwila, Wash. on MS-1000 Laser Scanner-Publication Date Unknown.

Primary Examiner—Davis L. Willis
Assistant Examiner—Edward Sikorski

[57] ABSTRACT

The visibility of a laser beam emitted by a laser diode in a scanner is enhanced to facilitate aiming the laser beam at a symbol to be read. An aperture stop in an optical train has an increased dimension along a non-scan direction. The magnification of a focusing lens in the optical train is increased. Laser diode astigmatism is affirmatively used to enhance visibility. What results is an aiming spot (or aiming scan line) at a farther plane (d6) that is more visible to the user than the scanning spot at a closer plane (d3), at which closer plane the scanner is able to read a bar code.

46 Claims, 5 Drawing Sheets

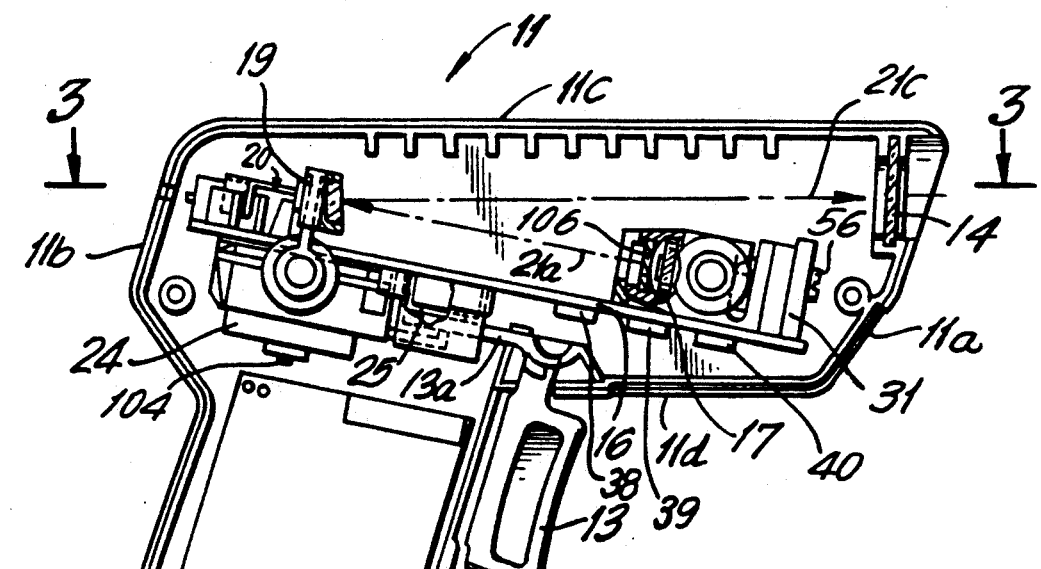
FIG. 2
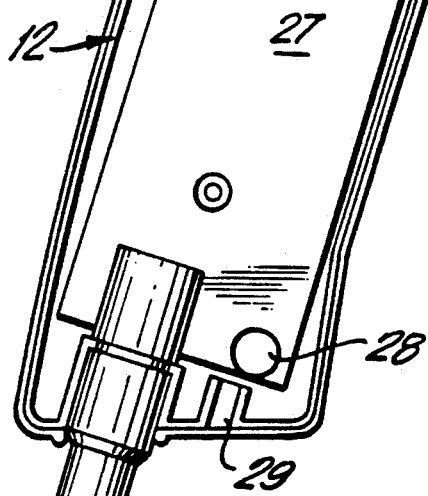
FIG. 3
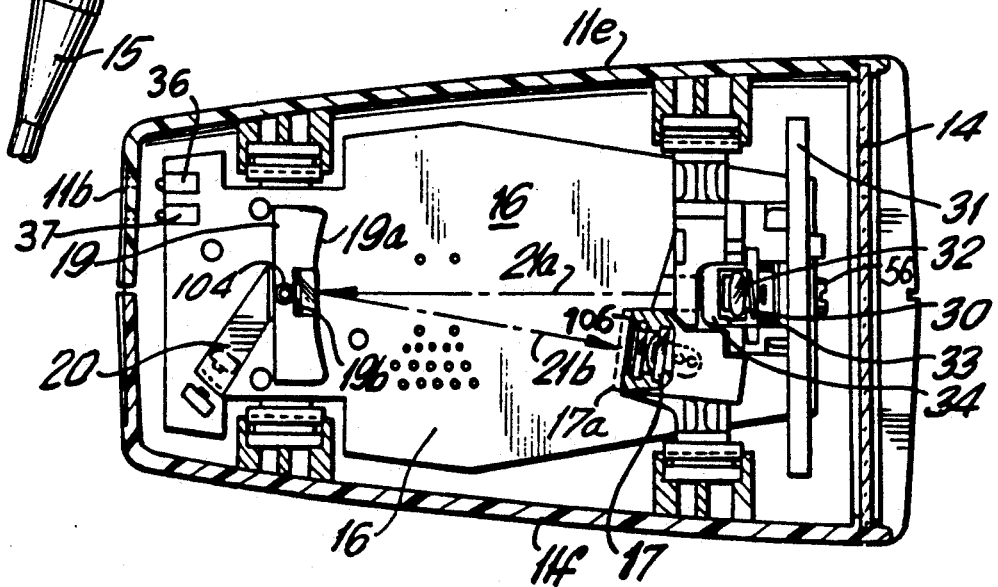

LASER DIODE SCANNER WITH ENHANCED VISIBILITY AT AN AIMING DISTANCE RELATIVE TO THE READING DISTANCE

This is a continuation of application Ser. No. 07/706,246 filed May 28, 1991, now abandoned, which is a continuation of Ser. No. 07/265,149 filed Oct. 31, 1988, now abandoned.

BACKGROUND OF THE INVENTION

1. Field of the Invention

This invention generally relates to laser scanning systems for reading indicia having portions of different light reflectivity such as bar code symbols and, more particularly, to a lightweight, multi-component, portable laser diode scanning head supportable by a user and aimable at each symbol to be read and, still more particularly, this invention relates to increasing the visibility of the laser beam emitted by the laser diode in the head to facilitate aiming the laser beam at the symbol.

2. Description of Related Art

Various optical readers and optical scanning systems have been developed heretofore to optically read bar code symbols printed on labels affixed to objects in order to identify the object by optically reading the symbol thereon. The bar code symbol itself is a coded pattern comprised of a series of bars of various widths, and spaced apart from one another to bound spaces of various widths, said bars and spaces having different light-reflecting characteristics. Such readers and systems electro-optically decoded the coded patterns to a multiple alpha-numerical digit representation descriptive of the object. Scanning systems of this general type, and components for use in such systems, have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,816,660; 4,816,661; 4,806,742; 4,835,374; 4,845,350 and 4,871,904, as well as in U.S. patent application Ser. Nos. 7,775 and 193,265; all of which have been assigned to the same assignee as the instant application and are incorporated herein to show the state of the art.

As disclosed in some of the above patents and applications, a particularly advantageous embodiment of such a scanning system resided, inter alia, in optically modifying and directing a laser light beam from a hand-held head which was supported by a user; aiming the head and, in some cases, the laser beam itself at a symbol to be read; repetitively scanning the laser beam and/or the field of view of a detector across the symbol; detecting the laser light reflected off the symbol during scanning; and decoding the detected reflected light.

When the laser beam was generated by a helium-neon gas laser which emitted a red laser light at a wavelength of about 633 nm, the red laser light was readily visible to the user and, thus, the user, without difficulty, could properly aim the head and position and maintain the emitted red laser light on and across the symbol during the scanning.

When the laser beam was generated by a semiconductor laser diode which emitted infrared laser light at a wavelength of about 780 nm, the infrared laser light was, for all practical purposes, invisible. As explained, for example, in U.S. Pat. No. 4,760,248, the user could not see the invisible infrared laser light when the scanning occurred in a well-lit environment and at rapid scanning rates. Aiming of the head relative to the symbol was thus rendered difficult because, simply put, the user could not see the infrared light. The user was required to hunt around by trial and error, hope that the infrared light was eventually properly positioned on and across the symbol, and wait until the system advised him, typically by the lighting of an indicator lamp or by the sounding of an auditory beeper, that the symbol had indeed been successfully decoded and read.

To overcome the inefficiencies and time-consuming nature of the trial-and-error hunting technique, U.S. Pat. No. 4,835,374 described an aiming light arrangement for visually locating and, in some cases, tracking each symbol when the head emitted and/or received such invisible laser light. Although generally satisfactory for its intended purpose, the aiming light arrangement added weight, size, cost and power consumption to the head and, in the context of making the head as low in weight, as small in size, as inexpensive in cost, and as energy efficient as possible, was a less-than-ideal solution.

With the advent of laser diodes which emit laser light at a wavelength of about 670 to about 680 nm, the emitted laser light is at least marginally visible to the human eye. By way of comparison, laser light at a wavelength of 670–680 nm is about one-tenth as visible to the human eye as the red laser light emitted by a helium-neon gas laser at a wavelength of about 633 nm, but is more visible than the infrared laser diode light whose wavelength is about 780 nm. Nevertheless, in use, at rapid scanning rates on the order of 40 scans per second and in well-lit environments such as a supermarket, the visibility of the laser light at the 670–680 nm wavelength suffers, particularly when far-out symbols located well away from the head are to be read.

It will be recalled that the laser beam is optically modified and focused to form a beam spot having a minimum beam cross-section or waist at a reference plane, and that a symbol can be read at either side of the plane. For ease of description, a symbol located between the reference plane and the head is defined as a "close-in" symbol, whereas a symbol that is located on the other side of the reference plane away from the head is defined as a "far-out" symbol. The term "close-in" symbol is also intended to cover the situation where the symbol actually is contacted by the head, or where the reference plane is located immediately outside the head. The range between minimum and maximum distances at which the system can read a symbol is often defined as the "depth of field". The depth of field is, of course, different for symbols of different densities.

With these definitions in mind, it will be appreciated that even marginally visible laser light (of wavelength 670–680 nm) can be readily seen on a close-in symbol, primarily because the speed of the beam spot across the symbol is slower for a close-in symbol than for a far-out symbol. However, such marginally visible laser light cannot, or at least not very readily, be positioned on a far-out symbol where the beam spot speed is faster.

It would be very desirable to have a laser diode-based system wherein both close-in symbols (including symbols contacting the head) and far-out symbols could be readily aimed at and read without the use of hunting techniques or aiming light arrangements.

SUMMARY OF THE INVENTION

1. Objects of the Invention

It is a general object of this invention to overcome the aforementioned problems and drawbacks of known prior art laser scanning systems.

It is another object of this invention to increase the visibility of the laser beam emitted by a laser diode which emits laser light of at least marginal visibility.

Another object of this invention is to facilitate aiming the laser beam at and on the symbol.

Yet another object of this invention is to provide a hand-held laser diode scanning head which is lightweight, compact, rugged, non-wrist-and-arm fatiguing, and capable of emitting a laser beam visible to the human eye, whereby the visible laser beam can be readily positioned on and across close-in and far-out symbols.

Still another object of this invention is to provide a laser diode scanning head capable of reading not only symbols in contact with the head, but also close-in and far-out symbols.

A further object of this invention is to eliminate the use of trial-and-error hunting techniques and aiming light arrangements to locate a symbol.

2. Features of the Invention

In keeping with these objects, and others which will become apparent hereinafter, one feature of this invention resides, briefly stated, in a laser scanning system for reading indicia having portions of different light reflectivity, e.g. a bar code symbol having alternating darker bars separated by lighter spaces of variable widths. The system includes a housing, and a light source means therein for generating an incident laser beam. Advantageously, the light source means comprises a semiconductor laser diode which emits laser light at a wavelength of about 670 to about 680 nm so that the emitted laser light is at least marginally visible to the human eye, as described in detail above.

Optic means are also provided in the housing, and are operative for optically forming and directing the incident laser beam along an optical path toward the symbol located within a range of working distances relative to the housing. Laser light is reflected off the symbol. At least a returning portion of the reflected light travels away from the symbol back toward the housing.

Scanning means, e.g. a scanning motor, having a reciprocally-oscillatable output shaft on which a reflecting surface such as a scanning mirror is mounted, are mounted in the head for scanning the symbol in a scan, and preferably at a plurality of sweeps per second across the symbol in a repetitive manner. The returning portion of the reflected laser light has a variable light intensity across the symbol during the scan which is due, in the case of a bar code symbol, to the different light-reflective characteristics of the bars and spaces which constitute the symbol.

The system also comprises sensor means, e.g. one or more photodiodes, for detecting the variable light intensity of the returning portion of the reflected laser light over a field of view, and for generating an electrical signal, typically an analog signal, indicative of the detected variable light intensity.

Signal processing means are provided for processing the analog electrical signal, and usually for processing the same to a digitized electrical signal which can be decoded to data descriptive of the symbol being scanned.

The scanning means is operative for scanning either the incident laser beam itself across the symbol, or the field of view of the sensor means, or both.

Decode/control electronic circuitry is sometimes, but not always, provided on-board the housing, but may also be located remotely therefrom. Such circuitry is operative for decoding the digitized signal to the aforementioned data, for determining a successful decoding of the symbol, and for terminating the reading of the symbol upon the determination of the successful decoding thereof. The reading is initiated by actuation of an actuator, typically a manually-actuatable trigger means provided on the housing, and operatively connected to, and operative for actuating, the light source means, the scanning means, the sensor means, the signal processing means, and the decode/control means. The trigger means is actuated once for each symbol, each symbol in its respective turn.

In a hand-held application, the housing, also called a laser scanning head, is supported by a user in his or her hand, is aimed at each symbol to be read and, once the symbol is located, the user actuates the trigger means to initiate the reading. The decode/control means automatically alerts the user when the symbol has been read so that the user can turn his or her attention to the next symbol, and repeat the reading procedure.

As noted above, a problem arises when the incident laser beam is only marginally visible to the user. If the user cannot readily see the laser beam itself, he or she does not know when the beam is positioned on the symbol, or whether the scanning laser beam is scanning over the entire length of the symbol.

Hence, in accordance with one feature of this invention, means are provided for increasing the visibility of the incident laser beam to an enhanced visibility. This feature enables the user to see and to position the visibility-enhanced laser beam on the symbol to be read over an extended range of working distances relative to the head. This range includes not only symbols contacting the head, but also close-in symbols located between the aforementioned reference plane and the head, and also far-out symbols located on the other side of the reference plane away from the head.

As explained above, close-in symbols are more readily visible than far-out symbols because, among other factors, the speed of the beam spot across the close-in symbol is slower than for a far-out symbol. As one goes further away from the head, the visibility decreases and, in order to enhance that visibility, this invention proposes decreasing the transverse dimension of the laser beam spot, thereby "sharpening" the beam spot at distances well away from the head.

In a preferred embodiment, the optic means includes an aperture stop having a first dimension or width along the scan direction, and a second dimension or height along the transverse direction which is generally perpendicular to the scan direction. The optic means optically modifies the laser beam to form a beam cross-section at the aperture stop having a scan dimension or width along the scan direction, and a transverse dimension or height along the transverse direction. Visibility is enhanced by increasing the height of the aperture stop to be about equal in size to the height of the laser beam at the aperture stop. By making the height of the aperture stop and the height of the laser beam cross-section thereat about equal, not only is the power loss of the laser beam passing through the aperture stop minimized, but also the height of the laser beam at the reference plane which is located exteriorly of the housing is decreased. This decrease in height renders the beam spot at the reference plane sharply focused, thereby rendering the beam spot more readily visible to the user.

Another technique for enhancing the visibility of the aforementioned marginally visible laser beam is to take advantage of the astigmatic properties of the laser diode. Heretofore, laser astigmatism was considered an optical aberration to be compensated for. One aspect of this invention is not to compensate for laser astigmatism, but, instead, to use it for a positive purpose, i.e. to enhance visibility.

The astigmatic laser diode can be characterized as having two apparent light sources spaced apart of each other along the optical path. One of the light sources lies in a horizontal plane, appears to be coming from inside the laser diode chip, and has a low angular divergence. The other apparent light source lies in a vertical plane, appears to be coming from a facet of the chip, and has a high angular divergence. These two apparent light sources, which are spaced apart from each other on the order of 20 microns, form two beam waists or minima in different planes and in different directions, as measured relative to the planar junction of the chip.

This aspect of the invention proposes using each apparent light source for a different purpose. The low angular divergence source, which is located further away from the symbol, is modified by the optic means in order to determine the size and location of the waist of the beam spot in order to effect scanning. The higher angular divergence source, which is closer to the symbol and originates from an external chip facet, is used to determine the vertical height of the beam spot in order to enhance visibility by increasing the sharpness of the beam spot.

The optic means also includes a focusing lens, and still another way of increasing the visibility of the marginally visible laser beam is to increase the magnification of the focusing lens. Whereas 20×–25× magnification factors were commonly used in prior art designs, this invention proposes to use much higher magnification factors on the order of 50×.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

BRIEF DESCRIPTION OF THE DRAWINGS

FIG. 2 is a vertical sectional view taken on line 2—2 of FIG. 1;

FIG. 3 is a plan sectional view taken on line 3—3 of FIG. 2;

DETAILED DESCRIPTION OF THE PREFERRED EMBODIMENTS

Figure 1:
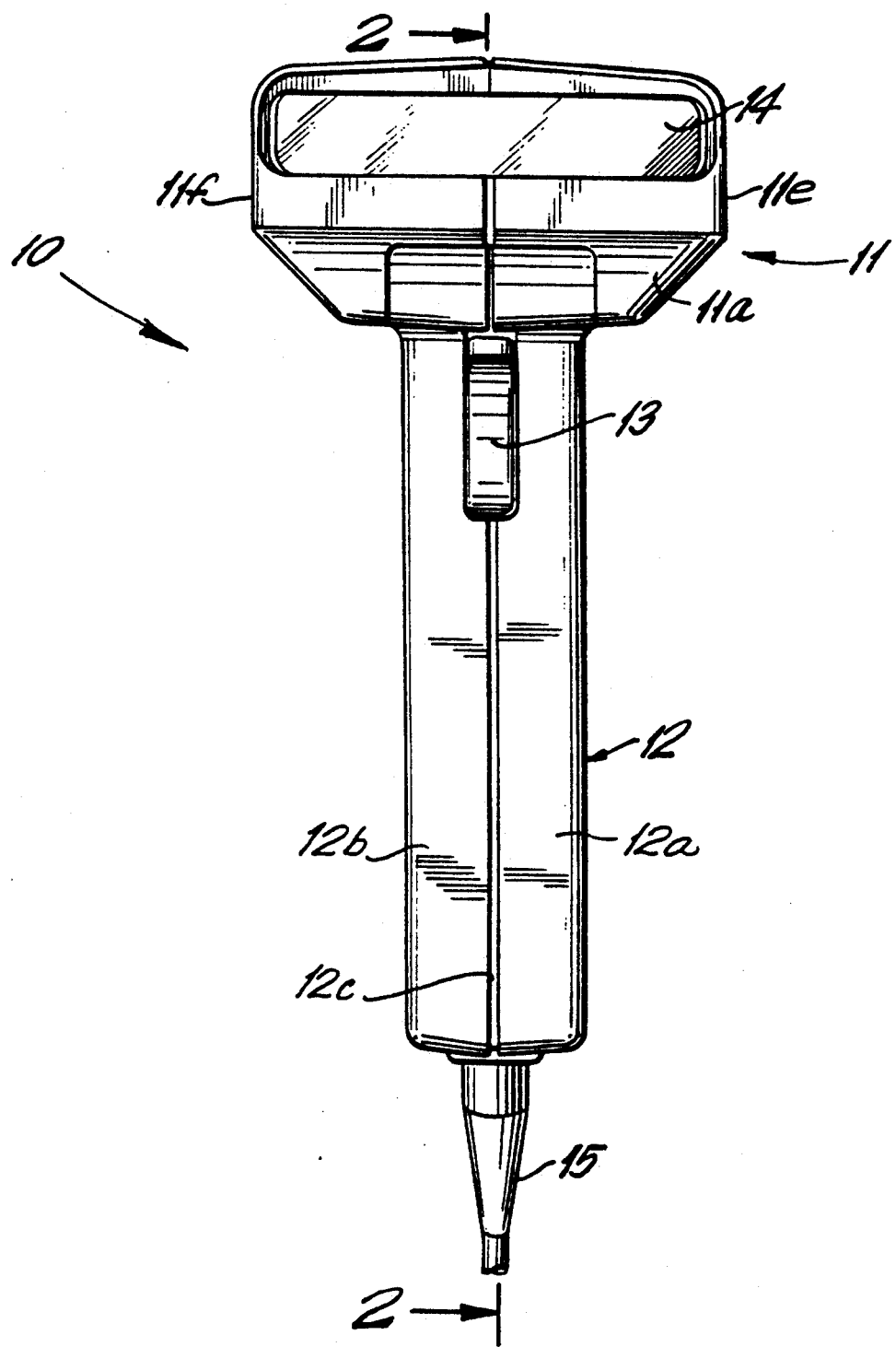
FIG. 1 is a front view of a laser scanning head according to this invention.

Referring now to FIGS. 1–4 of the drawings, reference numeral 10 generally identifies a lightweight (less than one pound), streamlined, hand-held, fully-portable, easy-to-manipulate, non-arm-and-wrist fatiguing laser scanning head supportable entirely by a user for use in a laser scanning system operative for reading, scanning and/or analyzing symbols, and aimable both prior to, and during, the reading thereof, by the user at the symbols, each symbol in its turn. The term "symbol", as used herein, is intended to cover indicia composed of different portions having different light-reflective properties at the wavelength of the light source, e.g. a laser, being utilized. The indicia may be the omnipresent Universal Product Code (UPC) symbol, or any of the black and white industrial symbols, e.g. Code 39, Codabar, Interleaved 2 of 5, etc. The indicia may also be any alphabetic and/or numeric characters. The term "symbol" is also intended to cover indicia located in a background field, wherein the indicia, or at least a portion thereof, have a different light-reflectivity property than that for the background field. In this latter definition, the "reading" of the symbol is of particular benefit in the fields of robotics and object recognition.

Turning now to FIG. 1, the head 10 includes a generally gun-shaped housing having a handle portion 12 of generally rectangular cross-section and generally elongated along a handle axis, and a generally horizontally-elongated barrel or body portion 11. The cross-sectional dimension and overall size of the handle portion 12 is such that the head 10 conveniently can fit and be held in a user's hand. The body and handle portions are constituted of a lightweight, resilient, shock-resistant, self-supporting material, such as a synthetic plastic material. The plastic housing preferably is injection-molded, but can be vacuum-formed or blow-molded to form a thin, hollow shell which bounds an interior space whose volume measures less than a value on the order of 50 cubic inches and, in some applications, the volume is on the order of 25 cubic inches or less. Such specific values are not intended to be self-limiting, but to provide a general approximation of the overall maximum size and volume of the head 10. The shell is formed of two housing parts 12a, 12b meeting along a generally vertical joining line 12c.

Figure 4:
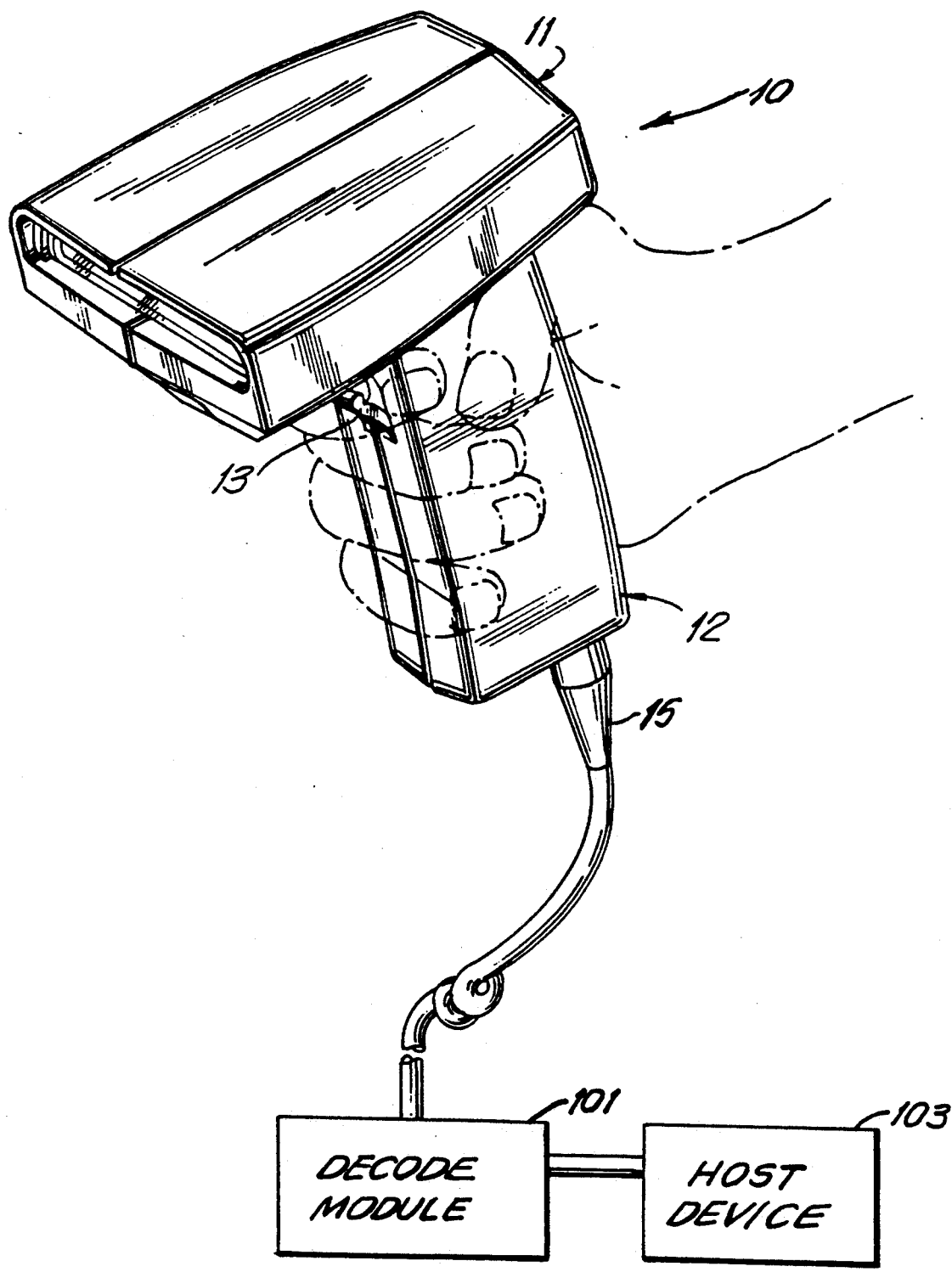
FIG. 4 is a front perspective view of the head of FIG. 1 in use, and schematically connected to other components of a laser scanning system.

As considered in an intended position of use as shown in FIG. 4, the body portion 11 has a front prow region or nose having an inclined front wall 11a. The body portion 11 also has a rear region or stern having a rear wall 11b spaced rearwardly of the inclined front wall 11a. The body portion 11 also has a top wall 11c, a bottom wall 11d below the top wall 11c, and a pair of opposed side walls 11e, 11f between the top and bottom walls. The front wall 11a is sloped relative to the top and bottom walls.

A manually-actuatable, and preferably depressible, trigger 13 is mounted on a cantilever resilient arm 13a for movement relative to the head in a forwardly-facing region where the handle and body portions meet and where the user's forefinger normally lies when the user grips the handle portion in the intended position of use. The bottom wall 11d has a lower opening, and the handle 12 has a forwardly-facing slot through which the trigger 13 projects and is moved. The arm 13a has one end overlying a trigger switch 25 which is switched from an open to a closed state upon depression of the trigger 13.

A window 14 is stationarily mounted at the nose and is light-transmissive to allow laser light to pass from the interior to the exterior of the head, and vice versa.

A flexible, non-bulky, coil-type electrical cable 15 with multiple freedoms of movement interconnects the head 10 to the remainder of the components of the laser scanning system, whose operation is explained in greater detail below.

A plurality of components are mounted in the head and, as explained below, at least some of them are actuated by the trigger 13, either directly or indirectly, by means of a control microprocessor. One of the head components is an actuatable laser light source (see FIGS. 3, 5 and 6), e.g. a semiconductor laser diode 33, operative, when actuated by the trigger 13, for propagating and generating an incident laser beam whose light, as explained above, is at least marginally visible to the human eye. The wavelength of the emitted beam is in the range from about 670 nm to about 680 nm. The emitted laser diode beam is highly divergent; diverges differently in different planes parallel and perpendicular to the longitudinal direction of beam propagation; is non-radially symmetrical, i.e. anamorphic; and has a beam cross-section resembling an oval. The diode may be of the continuous wave or pulse type. The diode requires a low voltage (e.g. 12 v DC or less) supplied by a power regulator and a battery (DC) source which may be provided within the head, or by a re-chargeable battery pack accessory detachably mounted on the head, or by a power conductor in the cable 15 connected to the head from an external power supply (e.g. DC source).

Figure 6:
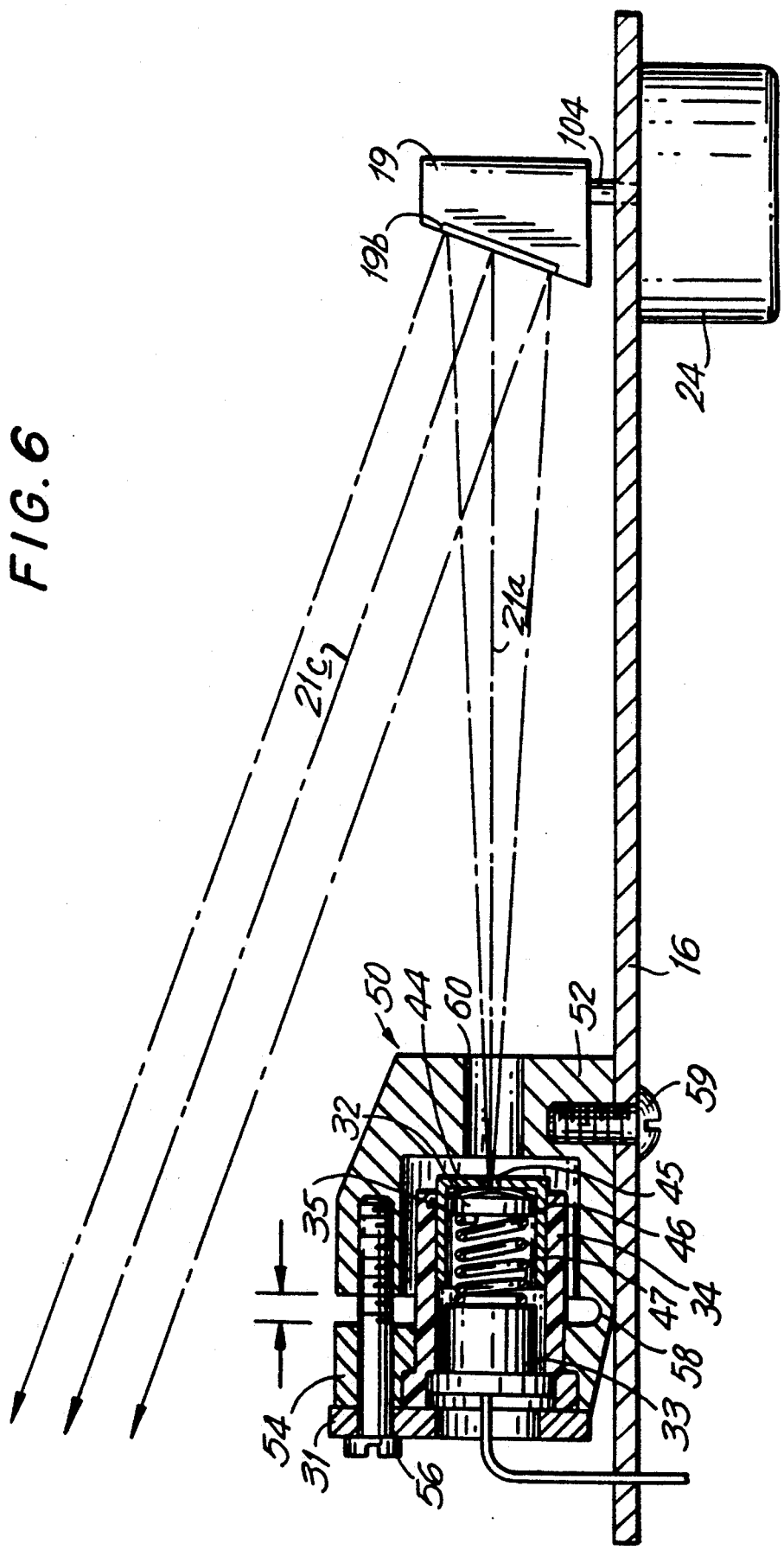
FIG. 6 is an enlarged sectional view of the optical assembly of FIG. 3.

As best shown in FIG. 6, an optical assembly 30 is mounted in the head on a thin, flexible, printed circuit board 16 and adjustably positioned relative to the same for optically modifying and directing the emitted laser beam along a first optical path 21a, 21c toward a reference plane which is located exteriorly of the head, either at the nose for reading symbols on objects in contact with the front wall 11a, or forwardly of the nose for reading symbols on objects out of contact with the front wall 11a. The reference plane lies generally perpendicular to the longitudinal direction along which the emitted laser beam propagates. A symbol to be read is located in the vicinity of the reference plane, either at, or at one side, or at an opposite side, of the reference plane; that is, anywhere within the depth of field of the optically modified laser beam and within a range of working distances as measured relative to the head. The laser beam reflects off the symbol as a specular component in one direction and as a scattered component in many directions, and that portion of the scattered laser light which travels along a second optical path 21c and 21b (see FIG. 3) away from the symbol back toward the head is known herein as the returning portion which, of course, also is at least marginally visible to the user.

As best shown in FIG. 6, the optical assembly includes an elongated, cylindrical optical tube 34 having at one end region a cylindrical bore in which an annular casing portion of the diode 33 is snugly received to hold the diode in a fixed position, and at the opposite end region of the optical tube 34 a lens barrel 35 is mounted for longitudinal movement. The lens barrel 35 includes an aperture stop 45, blocking wall portions 44 surrounding and bounding the aperture stop, and cylindrical side wall portions 46 which bound an interior space.

The optical assembly further includes a focusing lens 32, e.g. a plano-convex lens, located within the interior space of the side wall portions 46 in the first optical path, and operative (with the stop) for focusing the emitted laser beam at the reference plane. The aperture stop 45 may be located on either side of the lens 32, but preferably on the downstream side. A biasing means or tensioned coil spring 47 is located within the optical tube, and has one coil end bearing against a casing portion of the diode, and another coil end bearing against a planar side of the lens 32. The spring constantly urges the lens against the blocking wall portions, thereby fixedly locating the lens relative to the aperture stop. The lens and aperture stop are jointly moved when the lens barrel is longitudinally moved. The side wall portions are initially received in a threaded or sliding relationship with an inner circumferential wall bounding the optical tube, and are thereupon fixed, e.g. by glueing or clamping, to the inner circumferential wall when a desired longitudinal spacing between the lens and the aperture stop on the one hand, and the diode on the other hand, has been obtained. The longitudinal movement between the side wall portions and the inner circumferential wall of the tube constitutes an adjustable positioning means for the lens and the aperture stop, and the fixing in position of the lens and the aperture stop relative to the diode constitutes a means for fixedly locating the lens and the aperture stop at a predetermined spacing from the diode.

The aperture stop has a cross-section which is, as explained below, about equal to the cross-section of the emitted laser beam at the aperture stop, thereby permitting a major portion of the emitted laser beam to pass through the aperture stop downstream along the first optical path en route to the symbol. The aperture stop cross-section preferably is rectangular or oval, in which case, the longer dimension of the rectangular or oval cross-section is aligned with the larger divergence angle of the laser beam to transmit more energy to the symbol.

The optical assembly includes an optical block 50 having a front portion 52 and a rear portion 54 together bounding an interior in which the diode 33, optical tube 34, lens barrel 35 and the aforementioned components contained therein are received. A heat sink 31 is mounted in intimate thermal contact with the diode to conduct heat away from the same. An elevation adjustment means, including at least one threaded element 56, passes with clearance through aligned holes formed respectively in the heat sink and the rear portion 54, and is threaded into a threaded bore formed in the front portion 52. A hinge 58 is advantageously realized by providing a thin, flexible, weakened zone in the optical block between the front and rear portions thereof. The front portion 52 is stationarily mounted on the board 16 by anchors 59. The diode, tube, barrel and the components contained therein are mounted on the rear portion for movement therewith. Upon turning the element 56 in either circumferential direction about an axis along which the element 56 extends, the rear portion and all the components supported thereon will be angularly moved about the hinge 58 relative to the stationary front portion, thereby raising or lowering the emitted light beam which exits the block 50 through a clearance passage 60 which is dimensioned so as not to block the beam throughout its angular range of adjustment.

Figure 5:
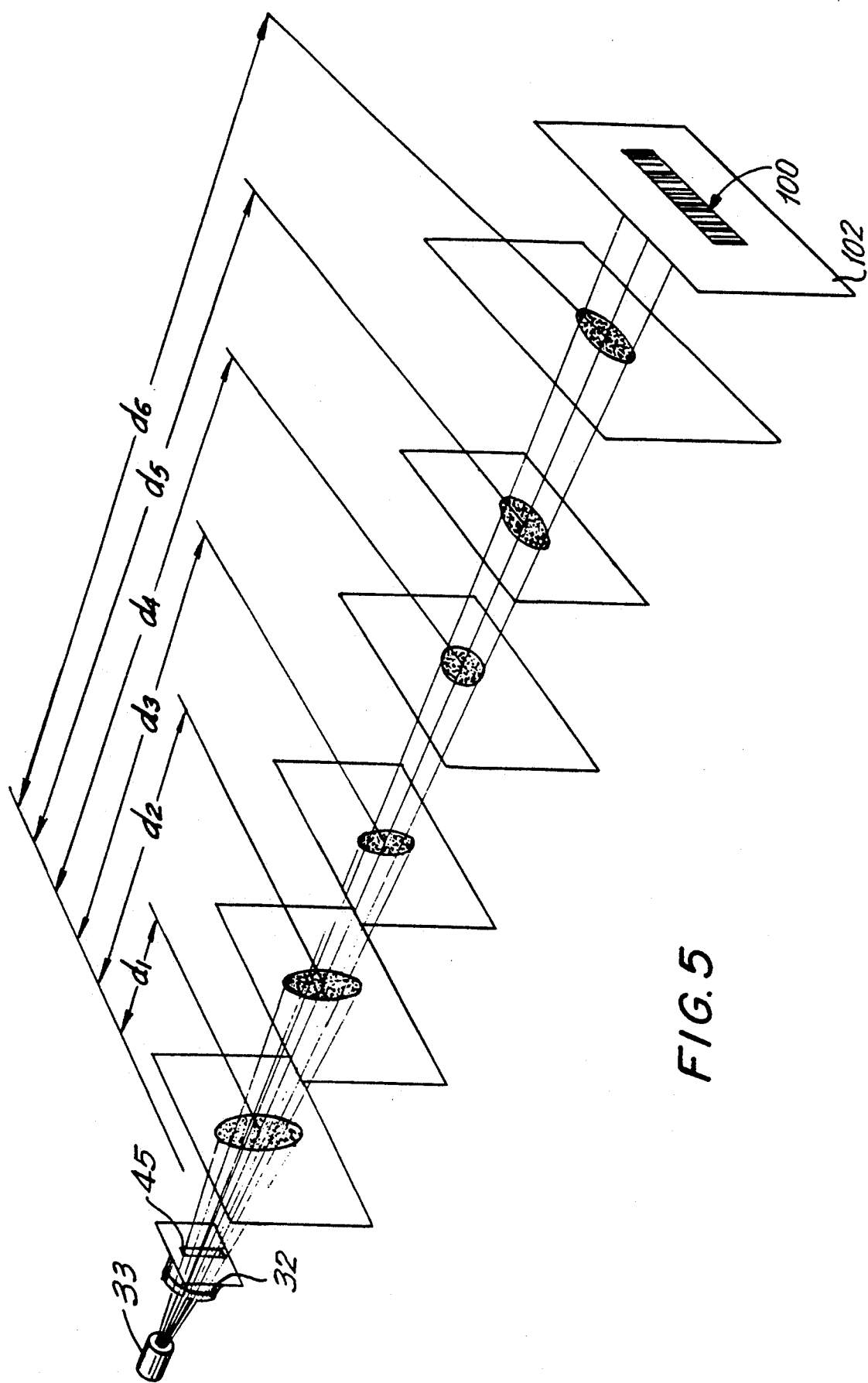
FIG. 5 is a perspective view depicting various cross-sections of the laser beam emitted by the head at distances d1 through d6 away from the head of FIG. 1.

The laser beam that passes through the passage 60 is directed rearwardly by the optical assembly along path 21a within the head to a generally planar scanning mirror 19b for reflection therefrom. The scanning mirror 19b forwardly reflects the laser beam impinging thereon along path 21c through the forwardly-facing, laser-light-transmissive window 14 and to the symbol. As best shown in FIG. 5, a representative symbol 100 (not to scale) in the vicinity of the reference plane 102 is shown and, in the case of a bar code symbol, is comprised of a series of vertical bars spaced apart of one another along a longitudinal direction. A laser beam spot (shown in enlarged view) is focused on the symbol. When the scanning mirror is, as explained below, reciprocally and repetitively oscillated transversely to sweep the laser beam lengthwise across all the bars of the symbol, a linear scan is generated. The linear scan can be located anywhere along the height of the bars provided that all the bars are swept. The length of the linear scan is longer than the length of the longest symbol expected to be read and, in a preferred case, the linear scan is on the order of 3 inches at the reference plane.

The scanning mirror 19b is mounted on a scanning means, preferably a high-speed scanner motor 24 of the type shown and described in U.S. Pat. No. 4,387,297, the entire contents of said patent being incorporated herein by reference and made part of the instant application. For the purposes of this application, it is believed to be sufficient to point out that the scanner motor 24 has an output shaft 104 on which a support bracket 19 is fixedly mounted. The scanning mirror is fixedly mounted on the bracket. The motor is driven to reciprocally and repetitively oscillate the shaft in alternate circumferential directions over arc lengths of any desired size, typically less than 360°, and at a rate of speed on the order of a plurality of oscillations per second. In a preferred embodiment, the scanning mirror and the shaft jointly are oscillated so that the scanning mirror repetitively sweeps the laser diode beam impinging thereon through an angular distance or arc length at the reference plane of about 32° and at a rate of about 20 scans or 40 oscillations per second.

Referring again to FIG. 3, the returning portion of the scattered component of the reflected laser light has a variable light intensity, due to the different light-reflective properties of the various parts that comprise the symbol 100, over the symbol during the scan. The returning portion of the reflected laser light is collected by a generally concave, spherical collecting mirror 19a, and is a broad conical stream of light in a conical collecting volume centered on path 21c. The collecting mirror 19a reflects the collected conical light into the head along path 21b through a laser-light-transmissive element 106 to a sensor means, e.g. a photosensor 17. The photosensor 17, preferably a photodiode, detects the variable intensity of the collected laser light over a field of view which extends along, and preferably beyond, the linear scan, and generates an electrical analog signal indicative of the detected variable light intensity.

The photosensor "sees" a collection zone or area on the symbol. The aforementioned angular adjustment means ensures that the emitted laser beam impinges on the symbol at the collection zone when the laser spot impinges on the symbol.

The collecting mirror 19a is also mounted on the support bracket 19 and, when the scanning mirror is actuated by the trigger, the collecting mirror is reciprocally and repetitively oscillated transversely, sweeping the field of view of the photodiode lengthwise across the symbol in a linear scan.

The scanning mirror and the collecting mirror are, in a preferred embodiment, of one-piece construction, but the scanning mirror can also be a discrete, small, planar mirror attached by glue, or molded in place, at the correct position and angle on a discrete, front surfaced, silvered concave mirror. The concave collecting mirror serves to collect the returning portion of the laser light and to focus the same on the photodiode.

Also mounted in the head are various electrical sub-circuits mounted on board 16. For example, signal processing means 38 on board 16 are operative for processing the analog electrical signal generated by the sensor, and for generating a digitized video signal. Data descriptive of the symbol can be derived from the video signal. Suitable signal processing means for this purpose was described in U.S. Pat. No. 4,251,798. Component 39 on board 16 constitutes drive circuitry for the scanner motor, and suitable motor drive circuitry for this purpose was described in U.S. Pat. No. 4,387,297. Component 40 on board 16 is a voltage converter for converting the incoming voltage to one suitable for energizing the laser diode 33. The entire contents of U.S. Pat. Nos. 4,251,798 and 4,387,297 are incorporated herein by reference and made part of the instant application.

The digitized video signal is conducted, in one embodiment, along cable 15 to decode/control means 101 (see FIG. 4) operative for decoding the digitized video signal to a digitized decoded signal from which the desired data descriptive of the symbol is obtained, in accordance with an algorithm contained in a software control program. The decode/control means includes a PROM for holding the control program, a RAM for temporary data storage, and a control microprocessor for controlling the PROM and RAM. The decode/control means determines when a successful decoding of the symbol has been obtained, and also terminates the reading of the symbol upon the determination of the successful decoding thereof. The initiation of the reading is caused by depression of the trigger. The decode/control means also includes control circuitry for controlling the actuation of the actuatable components in the head, as initiated by the trigger, as well as for communicating with the user that the reading has been automatically terminated as, for example, by sending control signals to indicator lamps 36, 37 to illuminate the same.

The decoded signal is conducted to a remote, host computer 103 which serves essentially as a large data base, stores the decoded signal and, in some cases, provides information related to the decoded signal. For example, the host computer can provide retail price information corresponding to the objects identified by their decoded symbols.

In another embodiment, the decode/control means and a local data storage means are mounted on another printed circuit board 27 in the handle portion, and store multiple decoded signals which have been read. The stored decoded signals thereupon can be unloaded to a remote host computer. By providing the local data storage means, the use of the cable during the reading of the symbols can be eliminated—a feature which is very desirable in making the head as freely manipulatable as possible. A beeper 28 is also optionally mounted on board 27 so that the user can hear through a port 29 in the handle when a symbol has been successfully read.

As previously noted, the light beam emitted by the diode 33 is marginally visible, and is of sufficient visibility to aim the beam at close-in symbols (including symbols on objects contacting the head), but is less than ideal when the attempt is made to aim the beam at far-out symbols due, among other factors, to the increase in linear spot speed as one goes further out from the head. To increase the visibility of the light beam, this invention proposes increasing the magnification of the focusing lens 32 to factors on the order of 45× to 50×, increasing the size of the aperture stop, and working with the astigmatic properties of the diode, rather than compensating for such astigmatic properties.

More particularly, by increasing the magnification of the lens 32, more power is transmitted to the scanning beam spot at the reference plane. Hence, the beam spot is brighter. By increasing the height or longer side of the rectangular aperture stop along the height or non-scan direction of the symbol, the height or longer axis of the beam spot is decreased as one goes further out from the head (compare distances d1–d6 of FIG. 5). As the height of the beam spot is decreased from a maximum at distance d1 to a minimum at distance d6, the scan line becomes sharper, i.e. finer, thereby further enhancing the visibility of the scan line across the symbol. At the same time, the width of the beam spot increases from a minimum at distance d1 to a maximum at distance d6.

As previously mentioned, the astigmatic diode appears to have two apparent laser sources spaced 20 $\mu$ apart, one source emitting light at a high divergence and being further from the lens 32, the other source emitting light at a low divergence and being closer to the lens 32. Rather than treating astigmatism as an optical aberration, this invention uses each source differently. The low divergent source is used to determine the waist size and location of the beam spot. Thus, the waist or minimum beam cross-section in the scan direction at distance $d_3$ serves as a reading spot. The high divergent source is used to determine the vertical height of the beam spot in the non-scan direction. Thus, the waist or minimum beam cross-section in the non-scan direction at distance $d_6$ serves as an aiming spot.

U.S. Pat. No. 4,760,248 disclosed a rectangular aperture stop measuring about 1 mm (scan direction) by 2 mm (non-scan direction) compared to a beam cross-section at the aperture stop measuring about 3 mm (scan direction) by 9.3 mm (non-scan direction), thereby resulting in a numerical aperture of 0.05. By contrast, the rectangular aperture stop of this invention measures about 1 mm (scan direction) by 4 mm (non-scan direction) compared to a beam cross-section at the aperture stop measuring about 1 mm (scan direction) by about 4.5 mm (non-scan direction), thereby resulting in a numerical aperture of about 0.1. It will be noted that the 4 mm vertical height of the rectangular stop of this invention compared to the 2 mm vertical height of the rectangular stop of U.S. Pat. No. 4,760,248 results in a beam cross-section of decreased height and more sharpness at the reference plane. Also, the vertical height of 4 mm of the stop of this invention allows more of the light to pass therethrough.

Still another way of enhancing the visibility of the laser beam is to increase the distance between the laser diode and the reference plane since this increases the beam cross-section. To maintain the beam cross-section constant, it is decreased by increasing the size of the aperture stop which, in turn, increases the output power of the beam. As shown in FIG. 2, the emitted laser beam traverses the length of the barrel twice along paths 21a and 21c. This "double path" increases the brightness of the scanning beam.

The laser scanning head of FIG. 2 is of the retro-reflective type wherein the outgoing incident laser beam, as well as the field of view of the sensor means, are scanned. It will be readily understood that other variants also are within the spirit of this invention. For example, the outgoing incident laser beam can be directed to, and swept across, the symbol through one window on the head, while the field of view is not scanned and the returning laser light is collected through another window on the head. Also, the outgoing incident beam can be directed to, but not swept across, the symbol, while the field of view is scanned.

The head herein need not be hand-held, but can be incorporated in a desk-top, stand-alone workstation in which the symbol is passed underneath an overhead window or port through which the outgoing beam is directed. Although the workstation itself is stationary during scanning, the symbol is movable relative to the workstation and must be registered with the outgoing beam and, for this purpose, the enhanced visibility laser beam described herein is advantageous. Also, the head may further include deactivation apparatus for changing the state of a surveillance device associated with a tag or label on which the symbol is provided, such as described in U.S. Ser. No. 236,249, assigned to the assignee of the instant application.

It will be understood that each of the elements described above, or two or more together, also may find a useful application in other types of constructions differing from the types described above.

While the invention has been illustrated and described as embodied in a laser diode scanner with enhanced visibility over extended working distance, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a laser scanning system for reading indicia having portions of different light reflectivity, said system being of the type including
   (A) a housing;
   (B) light source means in the housing for generating an incident laser beam of at least marginal visibility to a system operator;
   (C) optic means in the housing for optically forming and directing the incident laser beam along an optical path toward indicia located within a range of working distances relative to the housing to form a scanning spot on the indicia, thereby reflecting off the indicia reflected laser light, at least a returning portion of which travels away from the indicia back toward the housing;
   (D) scanning means in the housing for scanning the indicia in a scan across the indicia, said returning portion of the reflected laser light having a variable intensity over the scan;

(E) sensor means for detecting the variable intensity of the returning portion of the reflected laser light over a field of view, and for generating an electrical signal indicative of the detected variable light intensity;

(F) said scanning means being operative for scanning at least one of said incident laser beam and said field of view along a scan direction;

(G) signal processing means for processing the electrical signal, and for generating a processed signal indicative of the indicia; and (H) means for actuating the light source means, the scanning means, the sensor means and the signal processing means to initiate a reading of the indicia each in its respective turn, the improvement which comprises:

said optic means being further operative for increasing the visibility of the incident laser beam itself to form an aiming spot having an enhanced visibility greater than the visibility of the scanning spot to enable the system operator to see and to position the aiming spot on the indicia to be read over an extended range of working distances relative to the housing, said aiming spot being spaced along said optical path along which the incident laser beam is directed away from the scanning spot, whereby the same incident laser beam is used for aiming and reading.

2. The improved system as recited in claim 1, wherein the light source means is a laser diode operative for emitting the incident laser beam at a wavelength in the range from about 670 to 680 nm, said laser diode being astigmatic and having two apparent laser sources spaced apart along the optical path, one laser source emitting a laser beam of relatively low divergence, the other laser source emitting a laser beam of relatively high divergence; and wherein said optic means optically modifies said laser beam of relatively low divergence to form the scanning spot for scanning the indicia, and optically modifies said laser beam of relatively high divergence to form the laser beam with a reduced height as considered along a transverse direction generally perpendicular to the scan direction to form the aiming spot of greater visibility than said scanning spot.

3. The improved system as recited in claim 1, wherein the optic means includes a focusing lens having a magnification at least on the order of 40 times and is situated in the optical path.

4. The improved system as recited in claim 3, wherein the focusing lens has a magnification on the order of 45× to 50×.

5. The improved system as recited in claim 1, wherein the optic means includes an aperture stop in the optical path and having a first dimension along the scan direction and a second dimension along a transverse direction which is generally perpendicular to the scan direction; and wherein the optic means forms the incident laser beam to have a scan dimension along the scan direction and a transverse dimension along the transverse direction; and wherein said second dimension of the aperture stop is about equal in size to said transverse dimension of the laser beam at the aperture stop.

6. The improved system as recited in claim 5, wherein said second dimension of the aperture stop is about 4 mm, and wherein said transverse dimension of the laser beam at the aperture stop is about 4.5 mm.

7. The improved system as recited in claim 6, wherein said first dimension of the aperture stop is about 1 mm, and wherein said scan dimension of the laser beam at the aperture stop is about 1 mm.

8. The improved system as recited in claim 7, wherein the aperture stop has a numerical aperture of about 0.1.

9. The improved system as recited in claim 5, wherein the aperture stop is a generally rectangular opening having a numerical aperture of about 0.1.

10. The improved system as recited in claim 1, wherein the housing has a handle by which the housing is hand-held and aimed by the system operator at indicia contacting the housing in a contact mode of operation, at indicia located between the housing and one side of a reference plane located exteriorly of the housing in a close-in non-contact mode of operation, and at indicia located on the opposite side of the reference plane away from the housing in a far-out non-contact mode of operation.

11. The improved system as recited in claim 10, wherein the light source means is a laser diode operative for emitting the incident laser beam at a wavelength in the range from about 670 to 680 nm, the visibility of the incident laser beam on indicia in the far-out mode being less than the visibility of the incident laser beam on indicia in the close-in mode of operation.

12. The improved system as recited in claim 11, wherein the scanning means repetitively sweeps the incident laser beam a plurality of times per second across the indicia, the visibility of the swept laser beam on indicia in the far-out mode being less than the visibility of the swept laser beam on indicia in the close-in mode of operation.

13. The improved system as recited in claim 11, wherein the hand-held housing is operable in lit environments having ambient light tending to decrease the visibility of the incident laser beam.

14. The improved system as recited in claim 10, wherein the housing has an elongated barrel connected to the handle, said barrel having front and rear interior regions at opposite ends thereof, said light source means being located at said front interior region and facing said rear interior region, said scanning means including a reciprocating mirror in the optical path at said rear interior region, said incident laser beam traversing the barrel lengthwise more than once.

15. Apparatus for scanning and reading indicia having portions of different light reflectivity, such as bar code symbols, at a working distance between contact and a distance away from the apparatus, comprising:

(a) a laser diode light source for emitting a laser beam with an anamorphic gaussian beam cross-section having a major axis and a minor axis;

(b) an optical assembly having a magnification power of at least 40, and operative for optically modifying and directing the laser beam along an optical path through a window of the apparatus and toward a target located in the vicinity of a reference plane lying in the optical path so as to scan spatially adjacent portions of the reference plane along a relatively elongated scanning line extending along a scan direction, said optical assembly including (i) an optical aperture disposed in the optical path and having a rectangular aperture cross-section having a first long axis and a second short axis, said aperture cross-section being substantially concentric with, but only slightly smaller than, the beam cross-section, and (ii) a lens disposed in the optical path for focusing the laser beam so that the beam cross-section varies as a function of distance from the apparatus due to astigmatism of the laser beam, said lens forming the beam cross-section with the first and second minima along each of the major and minor axes of said beam cross-section in different planes generally normal to the optical path, said first minima of the laser beam along one of the major and minor axes lying in a plane relatively close to the window and serving as a reading spot, said second minima of the laser beam along the other of the major and minor axes being spaced apart from the window by a relatively large distance in a plane further from the window, said second minima of the beam along said other axis having an increased contrast as compared to the reading spot, thereby enhancing the visibility of a reflection of the beam from the target at the reference plane and serving as an aiming spot;

(c) scanning means for repetitively scanning the directed laser beam across each symbol for reflection therefrom; and (d) sensor means for detecting light of variable intensity reflected from each symbol, and for generating an electrical signal indicative of the detected intensity for each symbol.

16. The apparatus as recited in claim 15, wherein the wavelength of the laser beam is approximately 670 to 680 nanometers.

17. The apparatus as recited in claim 15, wherein the first minima lies sufficiently close to the window so that the apparatus is capable of validly reading symbols in a plane disposed in contact with the apparatus.

18. The apparatus as recited in claim 15, wherein the second minima lies at least six inches from the first minima away from the apparatus.

19. The apparatus as recited in claim 15, wherein the sensor means includes a generally rectangular detector aperture operative for minimizing interference between ambient light and a returning portion of the reflected laser light, said detector aperture having a long side extending along the scan direction, thereby forming a generally non-circular field of view.

20. The apparatus as recited in claim 15, wherein the optical aperture has a numerical aperture of approximately 0.11 in the scan direction.

21. The apparatus as recited in claim 15; and further comprising manually-actuatable trigger means on the apparatus and operatively connected to at least one of the light source, scanning means and sensor means, said trigger means being operative for initiating a reading of the symbol upon manual actuation of the trigger means by a user, said trigger means being actuatable for each symbol to be read, each symbol in its respective turn.

22. Apparatus for scanning and reading indicia having portions of different light reflectivity, comprising:

(A) a hand-held housing aimable by a system operator in a lit ambient environment at contacting indicia in contact with the housing in a contact mode of operation, at close-in indicia located between the housing and one side of a reference plane located exteriorly of the housing in a close-in non-contact mode of operation, and at far-out indicia located at the opposite side of the reference plane away from the housing in a far-out non-contact mode of operation;

(B) a laser diode in the housing for generating an incident laser beam having a wavelength in a predetermined range;

(C) optic means in the housing for optically forming and directing the incident laser beam along an optical path toward indicia located within a range of working distances relative to the housing to form a scanning spot on the indicia, thereby reflecting off the indicia reflected laser light, at least a returning portion of which travels away from the indicia back toward the housing;

(D) scanning means in the housing for scanning the indicia at a predetermined scanning speed in a scan across the indicia, said returning portion of the reflected laser light having a variable intensity over the scan;

(E) sensor means for detecting the variable intensity of the returning portion of the reflected laser light over a field of view, and for generating an electrical signal indicative of the detected variable light intensity;

(F) said scanning means being operative for scanning at least one of said incident laser beam and said field of view along a scan direction;

(G) signal processing means for processing the electrical signal, and for generating a processed signal indicative of the indicia;

(H) means for actuating the laser diode, the scanning means, the sensor means and the signal processing means to initiate a reading of the indicia each in its respective turn;

(I) said incident laser beam having a visibility which decreases as the wavelength of the incident laser beam increases, as the scanning speed increases, as the intensity of the ambient environment light increases, and as the distance of the indicia relative to the housing increases; and (J) said optic means being further operative for increasing the visibility of the incident laser beam itself to form an aiming spot having an enhanced visibility greater than the visibility of the scanning spot to enable the system operator to see and to position the aiming spot on the indicia to be read over an extended range of working distances relative to the housing, said aiming spot being spaced along said optical path along which the incident laser beam is directed away from the scanning spot, whereby the same incident laser beam is used for aiming and reading.

23. Apparatus for scanning and reading indicia having portions of different light reflectivity, comprising:

(a) a housing having a window;

(b) a laser diode light source in the housing, and operative for emitting a marginally visible laser beam having a beam cross-section with a major beam axis and a minor beam axis; and (c) an optical assembly for optically modifying and directing the laser beam through the exit port and toward indicia exteriorly of the housing, including an elongated aperture having long and short aperture axes respectively aligned with the major and minor beam axes, said aperture having an aperture cross-section concentric with, and slightly smaller than, the beam cross-section, said long aperture axis optically modifying the laser beam to have a minimum dimension along the major beam axis at a predetermined distance away from the window exteriorly of the housing, to form the laser beam as a visible aiming mark on the indicia, and a focusing lens for optically modifying the laser beam to have a minimum dimension along the minor beam axis at a different distance away from the window exteriorly of the housing which is smaller than said predetermined distance, to form the laser beam as a reading mark on the indicia to read the indicia, whereby the same marginally visible laser beam is used both for aiming and reading.

24. A laser scanning system for reading indicia having portions of different light reflectivity, comprising:
(a) a housing movable relative to indicia to be read;
(b) a light source for generating a laser beam of at least marginal visibility to a system operator;
(c) optical means for optically modifying the laser beam to form at a first plane relative to the housing a reading spot for reading indicia, said reading spot being not readily visible to the system operator, and to form at a second plane, spaced further away from the housing than the first plane, an aiming spot from the same incident laser beam, said aiming spot being more visible to the system operator than the reading spot, thereby enabling the system operator, to see and position the aiming spot on the indicia prior to reading the indicia with the reading spot; and
(d) means for scanning the reading spot over the indicia in a range of working distances at the first plane to read the indicia.

25. The system as recited in claim 24, wherein the reading spot has a width dimension along a scan direction extending across the indicia, and a height dimension along a non-scan direction extending transversely of the scan direction; and wherein the aiming spot has an elongated width dimension longer than said width dimension of the reading spot along the scan direction, and a reduced height dimension shorter than said height dimension of the reading spot along the non-scan direction.

26. The system as recited in claim 25, wherein the reading spot has a generally circular beam cross-section; and wherein the aiming spot has a generally oval beam cross-section.

27. The system as recited in claim 25, wherein the optical means includes a generally rectangular aperture stop having a first axis along the non-scan direction having a first dimension, and a second axis along the scan direction having a second dimension shorter than said first dimension, and further a focusing lens having a magnification of at least forty times.

28. The system as recited in claim 27, wherein said aperture stop has a numerical aperture of about 0.1 in the scan direction.

29. The system as recited in claim 27, wherein the aperture stop measures about 4 mm along the non-scan direction, and about 1 mm along the scan direction.

30. The system as recited in claim 27, further comprising a focusing lens that engages the aperture stop.

31. The system as recited in claim 25, wherein the optical means forms said dimensions of the reading spot and the aiming spot independently of the operation of the scanning means.

32. The system as recited in claim 31, wherein the aiming spot has a generally linear shape.

33. The system as recited in claim 24, wherein the scanning means sweeps the reading spot in a linear sweep over the indicia.

34. The system as recited in claim 24, wherein the scanning means is also operative for scanning the aiming spot over the indicia in a range of aiming distances at the second plane.

35. The system as recited in claim 34, wherein the scanning means sweeps the aiming spot in a linear sweep over the indicia.

36. The system as recited in claim 34, wherein the working distances and the aiming distances are spaced apart of one another.

37. The system as recited in claim 24, and further comprising manually-actuatable trigger means for initiating aiming the aiming spot on the indicia prior to reading.

38. The system as recited in claim 24, and further comprising manually-actuatable trigger means for initiating reading of the indicia.

39. The system as recited in claim 24, and further comprising manually-actuatable trigger means for initiating aiming the aiming spot on the indicia prior to reading, as well as reading of the indicia.

40. A laser scanning system for reading indicia in a working range at either side of a reference plane, said indicia having portions of different light reflectivity, said system scanning at least one of an incident laser beam and a field of view along said indicia in a scan direction, said system including:
a) a housing;
b) a laser light source in the housing for generating a generally divergent laser beam having a non-radially symmetric cross-section having a first dimension generally aligned along the scan direction and a second dimension longer than said fist dimension aligned along a transverse direction generally perpendicular to the scan direction;
c) optical means in the housing for optically directing the incident laser beam along an optical path toward indicia located within a range of working distances relative to the housing, light from the incident laser beam reflecting off the indicia, at least a returning portion of such light traveling away from the indicia back toward the housing; said optical means including one or more focusing lenses and an aperture stop associated with the one or more focusing lenses in the optical path, the aperture stop being supported immediately adjacent one of said focusing lenses and having a first beam passing dimension along said scan direction and a second beam passing dimension along said transverse direction; and wherein the optical means forms the incident laser beam to a spot at the reference plane having a dimension in the scan direction approximately equal to its dimension in the transverse direction;
d) scanning means in the housing for scanning the indicia in a scan across the indicia, said returning portion of the reflected laser light having a variable intensity over the scan;
e) sensor means for detecting the variable intensity of the returning portion of the reflected laser light over a field of view, and for generating an electrical signal indicative of the detected variable light intensity;

f) said scanning means being operative for scanning at least one of said incident laser beam and said field of view along said scan direction;

g) signal processing means for processing the electrical signal, and for generating a processed signal indicative of the indicia; and h) means for actuating one or more of the light source means, the scanning means, the sensor means and the signal processing means for reading the indicia.

41. The laser scanning system according to claim 40 wherein said housing is configured to be held in the hand and said scanning system is a hand-held laser scanning system.

42. The laser scanning system according to claim 40 wherein said laser light source is a semiconductor diode.

43. The laser scanning system according to claim 40 wherein said light source generates visible light.

44. The laser scanning system according to claim 40 wherein the first and second beam passing dimensions are approximately equal to the first and second dimensions of the laser beam respectively.

45. The laser scanning system according to claim 40 wherein said reference plane is spaced at a distance from the housing which corresponds to the position of the focal point of the laser beam.

46. The laser scanning system according to claim 40 wherein said reference plane is spaced from the housing at a distance so that said system is able to read said indicia in a working range at either side of said reference plane.

* * * * *